June 9, 1936.　　G. A. DALZIEL ET AL　　2,043,608
AUTOMOBILE DOOR LOCK
Filed Oct. 28, 1932　　2 Sheets-Sheet 2
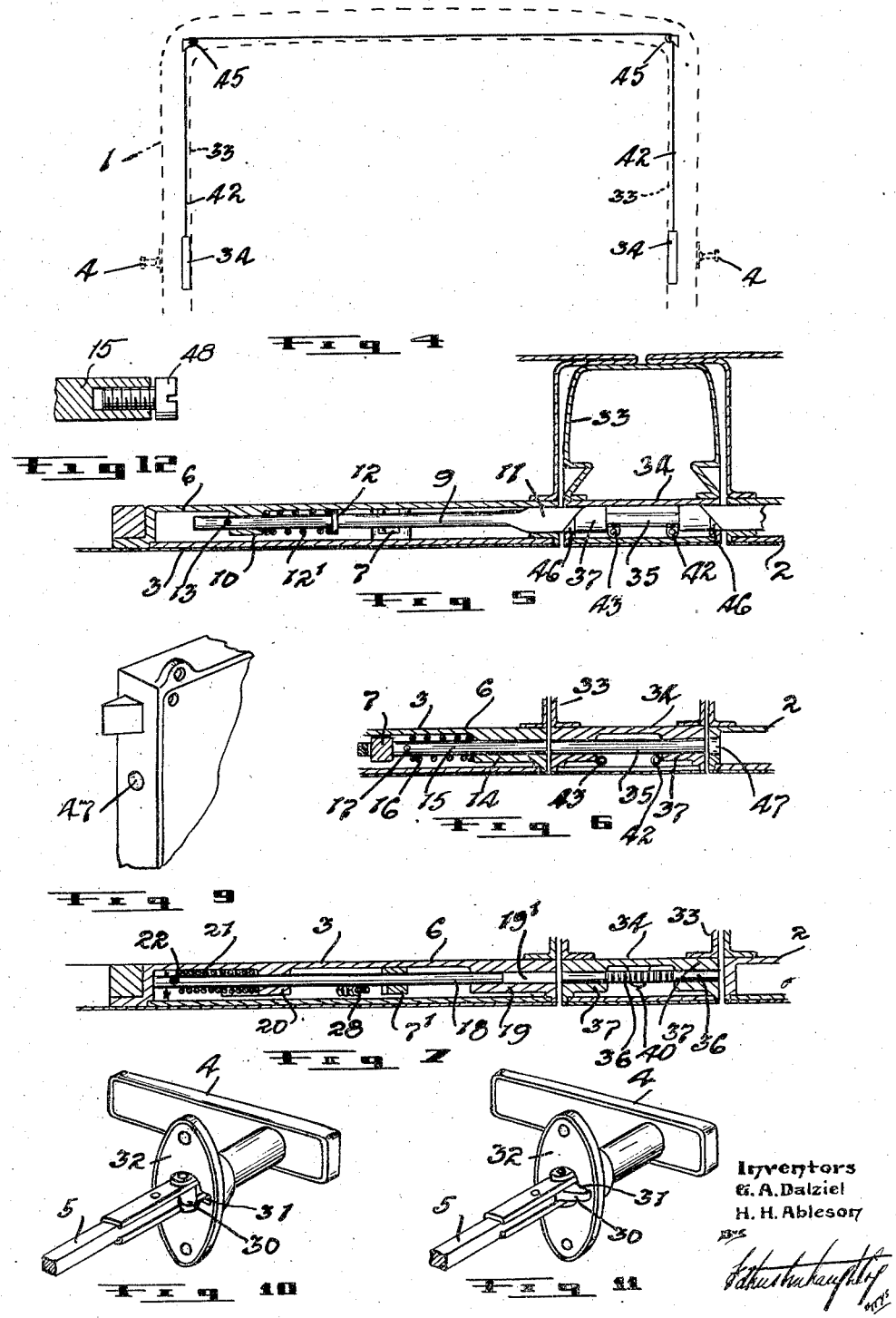
Inventors
G. A. Dalziel
H. H. Ableson Patented June 9, 1936

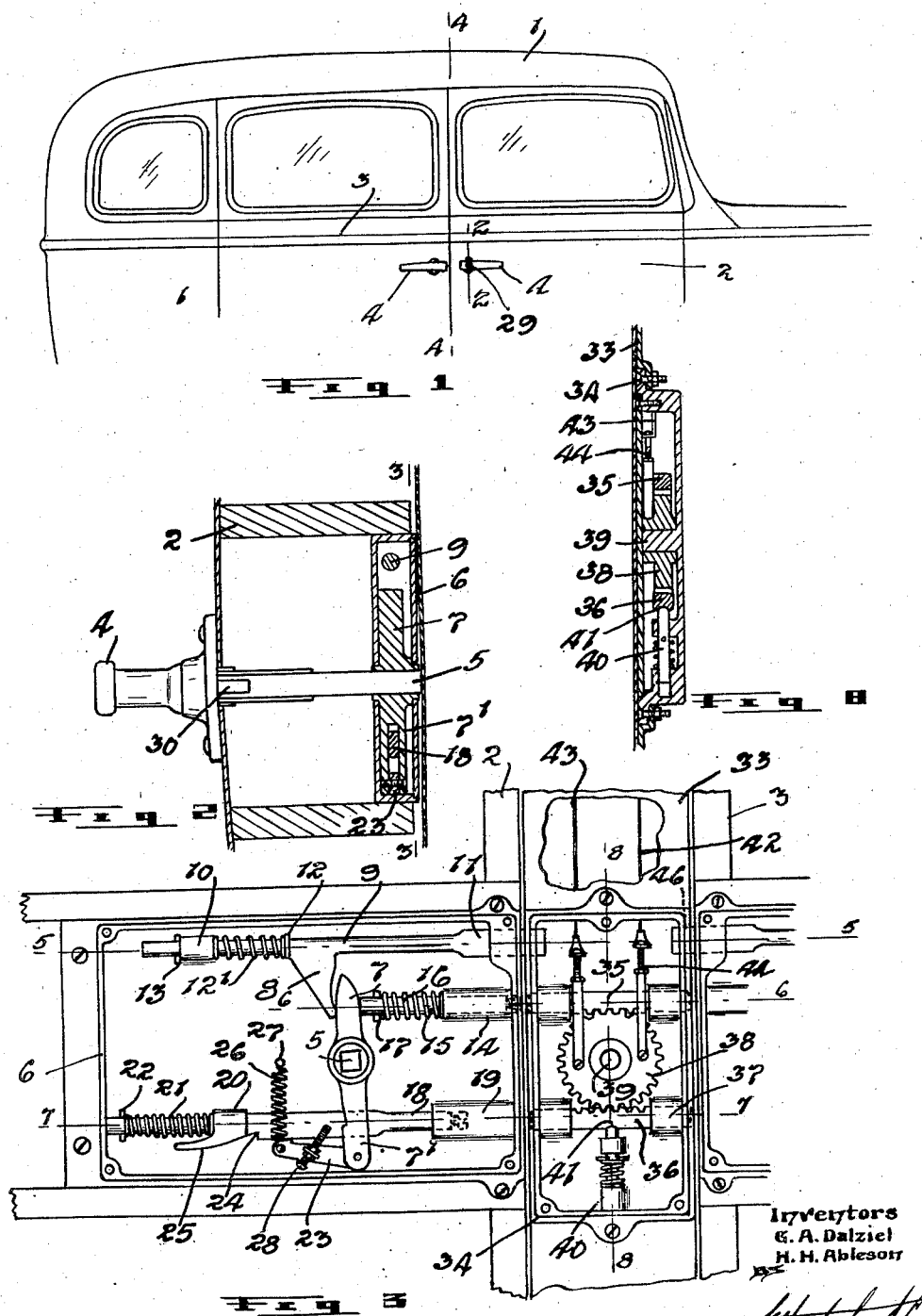

2,043,608

UNITED STATES PATENT OFFICE 2,043,608

AUTOMOBILE DOOR LOCK

Gordon A. Dalziel and Harold H. Ableson, Winnipeg, Manitoba, Canada

Application October 28, 1932, Serial No. 640,042

3 Claims. (Cl. 70—14)

The invention relates to improvements in automobile door locks and an object of the invention is to provide means whereby one can lock or unlock all doors of an automobile by an operation conducted at a selected point, such not only expediting the work of locking or unlocking the doors but also insuring the owner that when the said operation is completed, all doors are locked or unlocked.

A further object of the invention is to construct the various parts so that they can be readily installed on the existing types of automobiles and without requiring any material change in the structure thereof and further to so design the various parts that they can be supplied at relatively small cost, will not get out of order and will be very positive in their action.

A still further object is to provide a mechanism which will be entirely operated from the same front door as it is now customary to lock with a key (hereinafter called the master door) and such that when the driver turns the handle of the master door in a proper direction, he automatically effects the bolting of all doors and then by turning a key provided, locks the handle of the master door against movement.

A further object is to provide a construction which will in no way interfere with the opening or closing of the various doors in the usual way when the door locking parts are in their normal position.

A further object is to provide a construction which can be readily adapted for use on the two door car if so desired.

With the above more important objects in view, the invention consists essentially in the arrangement and construction of parts hereinafter more particularly described, reference being had to the accompanying drawings, in which:—

Fig. 1 is a side view of the body of an automobile.

Fig. 2 is an enlarged detailed vertical sectional view at 2—2 Figure 1.

Fig. 3 is a vertical sectional view at 3—3 Figure 2.

Fig. 4 is a cross sectional view through the car body and showing the flexible operating connection passing from side to side.

Fig. 5 is a horizontal sectional view at 5—5 Figure 3.

Fig. 6 is a horizontal sectional view at 6—6 Figure 3.

Fig. 7 is a horizontal sectional view at 7—7 Figure 3.

Fig. 8 is a vertical sectional view at 8—8 Figure 3.

Fig. 9 is a perspective view of the locking plate used.

Fig. 10 is a perspective view of the key actuated lock in the unlocked position.

Fig. 11 is a perspective view of the key actuated lock in the locked position.

Fig. 12 is a detail view in section of the adjusting screw in one of the intermedite bolts.

In the drawings like characters of reference indicate corresponding parts in the several figures.

The automobile body 1 herein shown is provided at each side with the customary front and rear doors 2 and 3 supplied with the usual handles 4 for opening purposes.

Heretofore, it has been customary practice for the car driver when locking his car to individually lock the two rear doors and the front door next the driver by manipulating from the interior of the car, suitable locking latches or the like provided and then after getting out of the car, to lock the remaining front door with a car key. Such practice is rather a laborious operation and one may never feel positively sure that all doors have been locked.

According to our invention and assuming the car is provided with four doors as herein shown, all that the driver has to do when he desires to lock the car doors is to get out of the car at the door which is customarily locked by a key and which we hereinafter call the master door and then turn the handle of the master door in a proper direction and release it and then lock the master door with his key. Having done this, all doors will be positively locked closed.

In carrying out our invention, the handle of the master door is provided with an extending spindle 5 which is rotated by the handle and which passes into a box like casing 6 suitably mounted on the inner side of the master door flush with the inner face thereof. On the spindle, we mount a push finger 7 and a forked lever 7' which turn when the handle is turned. The finger presents a curved face which engages with the curved face of a lug 8 extending downwardly from the under side of an upper bolt 9 which has one end slidably carried in a suitable bearing 10 provided on the lock casing and the other end terminating in a latch bolt head 11 slidably mounted in the end of the casing 6. A collar 12 is secured to the bolt and a spring 12' is placed on the bolt between the collar and the bearing 10 and said spring operates to normally hold the latch bolt projected at the end of the casing, the movement of the latch bolt to the right in Figure 3 being limited by a stop pin 13 carried by the bolt and engageable with the bearing 10.

Directly under the latch bolt, the casing is provided with a sleeve like bearing 14 which receives an intermediate bolt 15 which has the front end thereof normally held pressed against the rear edge of the finger by the action of a spring 16 provided, the spring engaging the bearing 14 and a cross pin 17 carried by the bolt.

In the normal position of the handle, the front end of the bolt 15 is flush with the end of the casing and obviously upon turning the handle in a clockwise direction (Figure 3), the bolt will be projected beyond the end of the casing.

In the lower part of the casing, we provide a further lower bolt 18 which is slidably carried by bearings 19 and 20 supplied on casing 6. A spring 21 is mounted on the bolt and has one end engaging the bearing 20 and the other end engaging a stop pin 22 carried by the bolt. This spring operates to hold the bolt normally with its front end within the casing.

The forked lever 7' has a catch 23 pivotally attached thereto and underlying the bolt 18 and the catch is adapted to engage a notch 24 supplied in the under side of the bolt 18. Adjacent the notch, the bearing 20 is provided with an extension 25 which is adapted to carry the catch clear of the bolt when it is moved to the left from the notch in Figure 3. A coiled spring 26 is attached to the catch and to a pin 27 carried by the casing and such spring holds the free end of the catch normally engaged with the under side of the bolt 18. The catch carries an adjusting screw 28 which is adapted to engage the lever 7' and trip the catch at a selected time. We might here mention that the forked lever 7' spans the bolt 18.

By observing Figure 3, it will be seen that if one by manipulating the master door handle, turns the shank 5 in a counterclockwise direction, he will cause the latch bolt head 11 to be withdrawn or moved to the left and at the same time, the catch 23 will make an idle movement to the right and the bolt 15 will remain inert.

If one turn the shank in the opposite direction, the latch bolt head 11 will remain inert, the bolt 15 will be shifted to the right and the catch will be moved to the left and can sweep past the notch 24 and upon release of the handle, will be moved back under pressure of the spring 16 to become caught in the notch 24. Actually the arrangement of the parts is such that in the normal horizontal position of the handle 4 of the master door 2 and as shown in Figure 3, the latch bolt head is projecting beyond the casing to hold the door closed and the bolts 15 and 18 are not projecting from the casing and an up swinging of the said handle 4 operates to advance the bolt 15 and bring the catch 23 to a position such that upon the said handle being released, it becomes caught in the notch 24, the handle upon release returning to its normal horizontal position under the influence of the spring 16 during such return movement of the handle, the bolt 18 is advanced under the influence of the moving catch but such movement is only a relatively short one and only moves the bolt 18 a short distance in the bearing 19.

In this position of the handle, one locks the handle in the well known manner against turning by entering the car key in the key hole 29 and turning the key to locked position. We have not considered it necessary to show or give a detailed description of the well known key actuated lock, it being sufficient for the purpose of this specification to understand that when the entered key is turned to locked position, the handle cannot be moved and when the entered key is turned to unlocked position, the handle can be swung.

In Figures 10 and 11, we have shown one of the many well known key actuated devices for locking the handle and in explanation of this, may state that when the inserted key is in the unlocked position, the dog 30 is in the position shown in Figure 10 and is clear of the slot 31 provided in the base of the handle attaching plate 32.

When the key is turned to locked position, the dog appears as shown in Figure 11 where it has entered the slot and accordingly prevents rotation of the shank and consequently the handle.

In a four door car, there is a vertical post 33 at each side of the car between the doors and to each post, we secure a relatively small box like casing 34, each casing containing parts now described.

A pair of parallel horizontal lying locking bolts 35 and 36 are slidably carried in suitable bearings 37 provided within the casing and the inner sides of the locking bolts are both provided with rack teeth which are engaged continuously with the teeth of a pinion 38 rotatably mounted on a cross shaft 39 carried by the said casing. According to this arrangement, when the pinion is rotated, the bolts 35 and 36 are end shifted in opposite directions and it is to be here understood that the sides of the casing 34 are provided with holes permitting the ends of the said bolts to protrude when actuated in either direction. In their normal positions, neither end of either bolt projects beyond the casing in which position, they are shown in Figure 3.

A spring pressed detent 40 is provided within the casing 34 and is adapted to engage with a notch 41 formed in the under side of the lower bolt 36. When the detent is in the notch 41, it releasably holds both bolts against end shifting in their normal or non-projected positions as shown in Figure 3.

The pinions at opposite sides of the car body are connected together by flexible lines 42 and 43 such as cables, suitable means being provided for adjusting or taking up any slack in the cables, said means being generally indicated by the reference character 44.

The cables are herein shown as passing upwardly within the hollow posts and across the roof of the car, being suitably guided adjacent the roof on pulleys 45 provided.

The arrangement just described is such that should either one of the bolts 35 or 36 be forcibly end shifted, the remainder of said bolts will be simultaneously end shifted, the upper bolts moving in the opposite direction to the lower bolts.

The casing 34 on the post between the master door and the adjacent rear door is so placed that the bolts thereof are directly in horizontal alignment with the bolts 15 and 18 already described with the result that the bolts 35 and 36 can be simultaneously end shifted by end shifting either the bolt 15 or bolt 18 and further, the arrangement provided entails the end shifting of the bolts 35 and 36 at the opposite side of the car body due to the connecting cables.

The casings 34 are each provided adjacent their upper ends with holes 46 adapted to receive the usual handle operated spring pressed latch bolts for releasably holding the doors closed and in Figures 3 and 5 it will be observed that the latch bolt head 11 of the master door is holding that door closed and the latch bolt heads of the other doors are serving the same purpose. Each of the doors other than the master door is supplied with a locking hole 47 adapted to receive one or other of the locking bolts 35 or 36 and the lower bolt 36 next to the master door when extended, is adapted in the upturning of the handle of the master door to enter the end hole 19' of the bearing sleeve 19 and fasten the master door.

In order that the operation of the device may be clearly understood, we will now describe the manner in which it works assuming the master door has been closed and is held closed by the latch head 11 and that the other doors have been closed and are held closed by their latch bolts and that the parts are in the positions as shown in the drawings.

The owner of the car will turn the handle of the master door in a counterclockwise direction and this will cause the rear shifting of the bolt 15 which will engage with and rearwardly end shift the adjacent upper bolt 35. The rear end shifting of the upper bolt so occasioned causes the forward shifting of the adjacent lower bolt 36 and through the cables, the simultaneous rear end shifting of the lower bolt 36 at the opposite side of the car and the forward end shifting of the upper bolt 35 above the latter. The simultaneous end shifting of the four bolts, bolts all the doors in their closed position.

After the owner has rotated the handle in the counterclockwise direction mentioned, he releases it and it returns to its normal horizontal position, the actuating bolt 15 retracting under the influence of its spring and the other bolts 35 and 36 remaining in the position where they bolt the doors closed. The driver then turns the key to lock the handle against rotary movement with the result that none of the bolts can be actuated so that all doors are effectively locked closed.

When the driver subsequently desires to unlock the doors, he enters the key in the key hole and turns it to unlocked position and then turns the handle of the master door in a clockwise direction and this causes the rearward end shifting of the bolt 18 which engages with the adjacent end of the bolt 36 and end shifts it far enough to unbolt the master door.

The end shifting of the lower bolt 36 adjacent the master door so occasioned automatically through the racks, pinions and cables effects the unbolting of all the remaining doors and the bolts 35 and 36 have at such time been brought back to their original position. Upon release of the handle of the master door, the spring 12' returns the handle to its normal position.

In the unbolted and unlocked condition of the master door, the latch bolt thereof can be released by swinging the handle in a clockwise direction so that the normal opening or closing of the door is in no way interfered with. During such time, the catch 23 is playing idly over the under side of the bolt 18. In regard to the latter catch, it is to be noted that when the handle is turned in a counterclockwise direction, the catch moves ahead and enters the notch 24 and that when the handle is subsequently turned in a clockwise direction, the catch causes the rear shifting of the bolt 18 until such time that the adjusting screw 28 is struck by the lever 7' at which time, the catch is tripped or cleared from the notch and the bolt 18 is freed to spring ahead under the influence of the spring 21. The timing of the release of the catch is controlled by the adjustment of the screw.

In a case where the device is to be used for locking say the doors of a two door car, the lower bolt 36 at the right hand side of the car will bolt the right hand door in its closed position and the bolt 35 at the left hand side of the car will bolt the left hand door in its closed position and the other two bolts 35 and 36 will not be used for bolting purposes. In fact, the lower bolt at the left hand side of the car could be entirely dispensed with.

The spring pressed detent 40 is utilized to releasably hold the bolts 35 and 36 in their normal or neutral position so that there will be no tendency for them to shift unless they are forcibly actuated.

In order to provide for minor adjustments, the bolts 15 and 18 have their rear ends provided with adjusting screws 48 which screw into said ends of the bolts and which can be readily turned by a suitable tool such as a screw driver to make the desired minor adjustments.

Since various modifications can be made in the above invention, and many apparently widely different embodiments of same made within the scope of the claims, without departing from the spirit and scope thereof, it is intended that all matter contained in the accompanying specification shall be interpreted as illustrative only and not in a limiting sense and we desire only such limitations placed thereon as are specifically expressed in the accompanying claims.

What we claim as our invention is:—

1. In an automobile provided with a plurality of closed doors, the combination of a spring pressed latch bolt normally holding a selected door closed, a handle carried by the latter door and operating when turned in one direction from a neutral point to release the latch bolt, a spring retracted actuating bolt carried by the selected door and shifted by a turning movement of the handle in the opposite direction from said neutral point and against the action of the spring, door bolting means actuated by the latter shifting of the bolt and simultaneously bolting all doors closed and a self resetting bolt carried by the selected door and actuated by the turning movement of the handle in the original direction and operating in such movement to reset the door bolting means into its original position.

2. In an automobile provided with a plurality of closed doors, the combination of a spring pressed latch bolt normally holding a selected door closed, a handle carried by the latter door and operating when turned in one direction from a neutral point to release the latch bolt, a spring retracted actuating bolt carried by the selected door and shifted by a turning movement of the handle in the opposite direction from said neutral point and against the action of the spring, door bolting means actuated by the latter shifting of the bolt and simultaneously bolting all doors closed, means for locking the shank of the handle against movement in its neutral position and a self resetting bolt carried by the selected door and actuated by the turning movement of the handle in the original direction and operating in such movement to reset the door bolting means in its original position.

3. In an automobile provided with a plurality of closed doors, the combination of a latch bolt holding a selected one of the said doors closed, a handle carried by the latter door and turnable in one direction from a neutral point to release the latch bolt, an actuating bolt carried by the latter door and shifted by the turning movement of the handle in the opposite direction from the neutral point, door bolting means actuated by the latter shifting movement of said bolt for simultaneously bolting all the doors closed, and a resetting bolt carried by the selected door and actuated by the subsequent turning of the handle in the original direction and operating to reset the door bolting means in its original unbolting position.

GORDON A. DALZIEL.
HAROLD H. ABLESON.